(12) United States Patent
Hwang

(10) Patent No.: US 11,228,237 B2
(45) Date of Patent: Jan. 18, 2022

(54) SWITCHING POWER SUPPLY AND START-UP IMPROVEMENTS THEREOF

(71) Applicant: Champion Microelectronic Corporation, Hsinchu (TW)

(72) Inventor: Jeffrey Hwang, Saratoga, CA (US)

(73) Assignee: Champion Microelectronic Corporation, Hsinchu (TW)

( * ) Notice: Subject to any disclaimer, the term of this patent is extended or adjusted under 35 U.S.C. 154(b) by 519 days.

(21) Appl. No.: 15/943,923

(22) Filed: Apr. 3, 2018

(65) Prior Publication Data

US 2018/0226885 A1 Aug. 9, 2018

Related U.S. Application Data

(63) Continuation of application No. 15/143,086, filed on Apr. 29, 2016, now Pat. No. 9,966,840.

(60) Provisional application No. 62/156,157, filed on May 1, 2015, provisional application No. 62/273,203, filed on Dec. 30, 2015.

(51) Int. Cl.
*H02M 1/42* (2007.01)
*H02M 1/36* (2007.01)
*H02M 3/335* (2006.01)
*H02M 1/00* (2006.01)

(52) U.S. Cl.
CPC .......... *H02M 1/4208* (2013.01); *H02M 1/36* (2013.01); *H02M 1/4266* (2013.01); *H02M 1/0006* (2021.05); *H02M 1/007* (2021.05); *H02M 1/0025* (2021.05); *H02M 1/0032* (2021.05); *H02M 1/0064* (2021.05); *H02M 1/4225* (2013.01); *H02M 3/33576* (2013.01); *Y02B 70/10* (2013.01); *Y02P 80/10* (2015.11)

(58) Field of Classification Search
CPC ............................................. H02M 1/42–4291
See application file for complete search history.

(56) References Cited

U.S. PATENT DOCUMENTS

| | | | | |
|---|---|---|---|---|
| 6,657,417 B1* | 12/2003 | Hwang | ..................... | G05F 1/70 323/207 |
| 8,867,245 B1* | 10/2014 | Hwang | ............. | H02M 3/33507 363/79 |
| 9,510,401 B1* | 11/2016 | Kost | ................... | H02M 1/4225 |
| 2002/0140407 A1* | 10/2002 | Hwang | ............... | H02M 1/4225 323/207 |
| 2002/0196006 A1* | 12/2002 | Hwang | ............... | H02M 1/0845 323/288 |

(Continued)

FOREIGN PATENT DOCUMENTS

JP 2004063111 2/2004

*Primary Examiner* — Rafael O De Leon Domenech
(74) *Attorney, Agent, or Firm* — Westberg Law Offices

(57) ABSTRACT

The present invention is directed toward a switching power supply and improvements thereof. In accordance with an embodiment, a switching power supply is provided. The switching power supply comprises: a first power supply stage that forms an intermediate regulated voltage; and a second power supply stage configured to accept the intermediate regulated voltage and configured to form a regulated output voltage, wherein the intermediate voltage is set to an initial target level upon start-up of the power supply and wherein the intermediate regulated voltage is set to a second target level during steady-state operation of the power supply.

32 Claims, 17 Drawing Sheets

(56) References Cited

U.S. PATENT DOCUMENTS

| | | | | |
|---|---|---|---|---|
| 2002/0196644 | A1* | 12/2002 | Hwang | H02M 1/092 363/89 |
| 2003/0117819 | A1* | 6/2003 | Fahlenkamp | H02M 1/32 363/56.01 |
| 2003/0222633 | A1* | 12/2003 | Hwang | H02M 1/4225 323/282 |
| 2004/0174152 | A1* | 9/2004 | Hwang | H02M 1/4225 323/284 |
| 2005/0281057 | A1* | 12/2005 | Jung | H02M 3/1588 363/15 |
| 2009/0295349 | A1* | 12/2009 | Tao | H02M 3/33507 323/282 |
| 2010/0026208 | A1* | 2/2010 | Shteynberg | H05B 33/0815 315/297 |
| 2010/0073351 | A1* | 3/2010 | Lin | H02M 3/33523 345/212 |
| 2010/0156509 | A1* | 6/2010 | Ryu | H02M 1/4208 327/520 |
| 2010/0231178 | A1* | 9/2010 | Handa | H02J 7/0065 320/163 |
| 2011/0103104 | A1 | 5/2011 | Zhan et al. | |
| 2014/0177284 | A1 | 6/2014 | Nakano | |
| 2014/0241018 | A1* | 8/2014 | Hwang | H02M 3/3376 363/53 |
| 2016/0344280 | A1* | 11/2016 | Al-Shyoukh | H05B 45/385 |
| 2019/0181748 | A1* | 6/2019 | Ofek | H02M 7/219 |

\* cited by examiner

SWITCHING POWER SUPPLY AND START-UP IMPROVEMENTS THEREOF

This application is a continuation of U.S. application Ser. No. 15/143,086, filed Apr. 29, 2016, which claims priority of U.S. Provisional Application No. 62/156,157, filed May 1, 2015, and which claims priority of U.S. Provisional Application No. 62/273,203, filed Dec. 30, 2015. The entire contents of each of the above-identified applications is hereby incorporated by reference.

BACKGROUND OF THE INVENTION

The present invention relates to the field of switching power supplies.

An off-line power supply receives power from an alternating-current (AC) source and provides a voltage-regulated, direct-current (DC) output that can be used to power a load. An exemplary off-line power supply includes a power factor correction (PFC) stage and a DC-to-DC converter stage. The PFC stage receives the AC input signal, performs rectification and maintains current drawn from the AC source substantially in phase with the AC voltage so that the power supply appears as a resistive load to the AC source. The DC-to-DC converter stage receives the rectified output of the PFC stage and generates the voltage-regulated, DC output which can be used to power the load. The rectified output of the PFC stage is typically at higher voltage and is more loosely regulated than the output of the DC-to-DC stage.

It is desired to provide an improved switching power supply.

SUMMARY OF THE INVENTION

The present invention is directed toward a switching power supply and improvements thereof. In accordance with an embodiment, a switching power supply is provided. The switching power supply comprises: a first power supply stage that forms an intermediate regulated voltage; and a second power supply stage configured to accept the intermediate regulated voltage and configured to form a regulated output voltage, wherein the intermediate voltage is set to an initial target level upon start-up of the power supply and wherein the intermediate regulated voltage is set to a second target level during steady-state operation of the power supply.

The initial target level can be higher than the second target level. The intermediate voltage can be set to a third target level under light loading conditions. The third target level can be lower than the second target level. The second target level can be approximately 380 volts DC. The first power supply stage can be a power factor correction stage and the second power supply stage can be a DC-to-DC converter stage. The initial target level can be achieved by pulling current from a feedback voltage node. A switched current source can be coupled to the feedback voltage node. The switched current source can be controlled by comparing a soft start voltage ramp to a reference voltage and when the soft start voltage ramp reaches the reference level the switched current source can be disabled.

In accordance with a further embodiment, a switching power supply is provided. The switching power supply comprises a power supply stage having controller circuitry, the controller circuitry comprising a voltage regulator, wherein during a start-up phase of the switching power supply, the voltage regulator forms a first regulated output for powering the controller circuitry and wherein after the start-up phase, the first regulated output is coupled to a second voltage source, the second voltage source being regulated at a higher level than the first regulated output, thereby disabling the voltage regulator.

The first regulated output can be coupled to the second voltage source via a diode. The controller circuitry can control switching in the power supply for generating the second voltage source. The second voltage source can provide power for the controller circuitry after the start-up phase. The switching power supply can further comprise a power factor correction (PFC) stage that forms an intermediate regulated voltage. The power supply stage can comprise a DC-to-DC converter. The DC-to-DC converter can be configured to accept the intermediate regulated voltage. An output of the DC-to-DC converter can comprise the second voltage source. The voltage regulator can receive power from the PFC stage. The PFC stage can comprise a main inductor. Power can be provided to the voltage regulator by a current induced in a second inductor that is inductively coupled to the main inductor.

In accordance with a further embodiment, a switching power supply is provided. The switching power supply comprises a power supply stage having controller circuitry, the controller circuitry receiving power from a capacitor during a start-up phase, wherein the capacitor is charged by a rectified alternating-current (AC) signal via a transistor switch and the controller circuitry comprising a voltage regulator, wherein the controller circuitry receives power from the voltage regulator after the start-up phase.

The transistor switch can be initially closed. The capacitor can be charged to an initial voltage level and, when the initial voltage level is reached, the transistor switch can be opened. During the start-up phase, controller circuitry can control switching in the power supply stage to form a regulated voltage. If the voltage level on the capacitor falls below a threshold, the switching can be halted. When the voltage approaches the threshold, the transistor switch can be closed so as to charge the capacitor and to inhibit the voltage on the capacitor from reaching the threshold, thereby preventing the switching from being halted.

The power supply stage can comprise a power factor correction (PFC) stage that forms an intermediate regulated voltage. The switching power supply can further comprise a DC-to-DC converter. The DC-to-DC converter can be configured to accept the intermediate regulated voltage. An output of the DC-to-DC converter can provide power to the voltage regulator. The initial voltage level can be approximately 15.3 to 15.5 volts and the threshold can be approximately 10.0 volts. The transistor switch can be closed when the voltage on the capacitor reaches 11.0 volts. The transistor switch can be a depletion-mode MOSFET.

In accordance with an embodiment, a switching power supply is provided. The switching power supply comprises: a first power supply stage that forms an intermediate regulated voltage, the first power supply stage comprising first controller circuitry for controlling switching in the first power supply stage for forming the intermediate regulated voltage, wherein the intermediate voltage is set to an initial target level upon start-up of the power supply and wherein the intermediate regulated voltage is set to a second target level during steady-state operation of the power supply, and wherein the controller circuitry receives power from a capacitor during a start-up phase, wherein the capacitor is initially charged by a rectified alternating-current (AC) signal via a transistor switch and wherein the transistor switch is closed unless a voltage on the capacitor approaches a threshold; and a second power supply stage configured to accept the intermediate regulated voltage and configured to form a power supply output voltage, the second power supply stage comprising a controller circuitry for controlling switching in the second power supply stage and the controller circuitry of the second power supply stage comprising a voltage regulator, wherein during a start-up phase of the switching power supply, the voltage regulator forms a first regulated output for powering the controller circuitry of the second power supply stage and wherein after the start-up phase, the first regulated output is coupled to the power supply output voltage, the power supply output voltage being regulated at a higher level than the first regulated output, thereby disabling the voltage regulator.

These and other embodiments are described herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
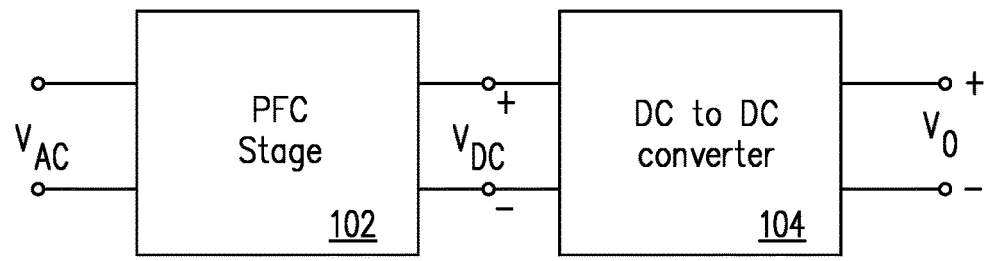
FIG. 1 illustrates a block schematic diagram of a two-stage, off-line power supply in accordance with an embodiment of the present invention.

The present invention is directed towards an improved switching power supply. In accordance with an embodiment of the present invention, an improved auxiliary power source is provided. A DC output of a switching power supply can be used as an auxiliary power source for providing power for control circuitry of the switching power supply. For example, in an off-line, two-stage switching power supply, one or more auxiliary DC outputs of the DC-to-DC converter stage can provide power to control circuitry of the PFC stage and to control circuitry of the DC-to-DC converter stage.

Upon start-up of the switching power supply, the PFC stage needs to generate its rectified output voltage and the DC-to-DC converter needs to generate a DC output before the DC output can be used as an auxiliary power source. During a start-up period before a DC output of the DC-to-DC converter stage is available for providing auxiliary power, the auxiliary power can be provided by an inductor that is coupled to the PFC main inductor. Specifically, upon commencement of switching in the PFC stage, a switched current through the PFC main inductor can be used to induce a current in a coupled inductor which can be used to generate auxiliary power. However, in some instances, switching in the PFC stage may cease prematurely. For example, when the AC input voltage applied to the PFC stage is unexpectedly high, this may cause the PFC stage to cease switching before sufficient auxiliary power is generated by the coupled inductor. This can occur if the AC input is higher than a target level set for the DC output of the PFC stage. The resulting lack of auxiliary power can cause the entire switching power converter to shut-down. For example, where the target level for the PFC output stage is 380 volts, and the AC input voltage is higher than 380 volts, this can result in a failure of the switching power supply to commence operation.

In accordance with an embodiment of the present invention, the target level for the PFC stage output is temporarily set to a level that is higher than its steady-state target level. For example, the steady-state target level for the PFC stage output can be 380 volts DC. Upon start-up of the switching power supply, the target level can be set to an elevated level, higher than 380 volts. For example, the initial elevated level can be 440 volts. If the AC input voltage is higher than 380 volts DC, but lower than 440 volts DC, then the switching power supply can be expected to successfully commence operation. The elevated target level is preferably set to a level higher than the expected range of AC input voltages. Once the power supply is up and running, the target level for the PFC output can be returned to its steady-state level. In this example, the level can be returned to 380 volts.

As described above, the PFC stage output can be configured for two different target levels; one for starting up the power supply and one for steady-state operation. In a further embodiment, the PFC stage can be configured for one or more additional target levels. For example, under light loading conditions, the PFC stage may operate more efficiently if its output voltage level is adjusted down. For example, the PFC can be configured for a third target level, lower than the first, for light load conditions. When the steady-state target level is 380 volts DC, this can also be the target level for "full load" conditions. However, under light load conditions, the target level can be reduced to approximately 342 volts DC.

FIG. 1 illustrates a block schematic diagram of a two-stage, off-line power supply 100 in accordance with an embodiment of the present invention. As shown in FIG. 1, a power factor correction (PFC) stage 102 has an input coupled to alternating-current (AC) source $V_{AC}$. The PFC stage 102 performs rectification on the AC input signal and maintains current drawn from the AC source substantially in phase with the AC voltage so that the power supply 100 appears as a resistive load to the AC source.

The PFC stage 102 generates a loosely regulated voltage, $V_{DC}$, which is provided as input to a DC-to-DC converter 104. Using the input $V_{DC}$, the DC-to-DC converter stage 104 generates a voltage-regulated, DC output, $V_O$, which can be used to power a load. The level of $V_{DC}$ is preferably at a higher voltage and is more loosely regulated than the output $V_O$ of the DC-to-DC converter stage 104. The nominal level of the output, $V_{DC}$, of the PFC stage 102 may be, for example, approximately 380 volts DC, while the voltage-regulated output $V_O$ of the DC-to-DC converter stage 104 may be, for example, approximately 12.0 volts DC.

Figure 2:
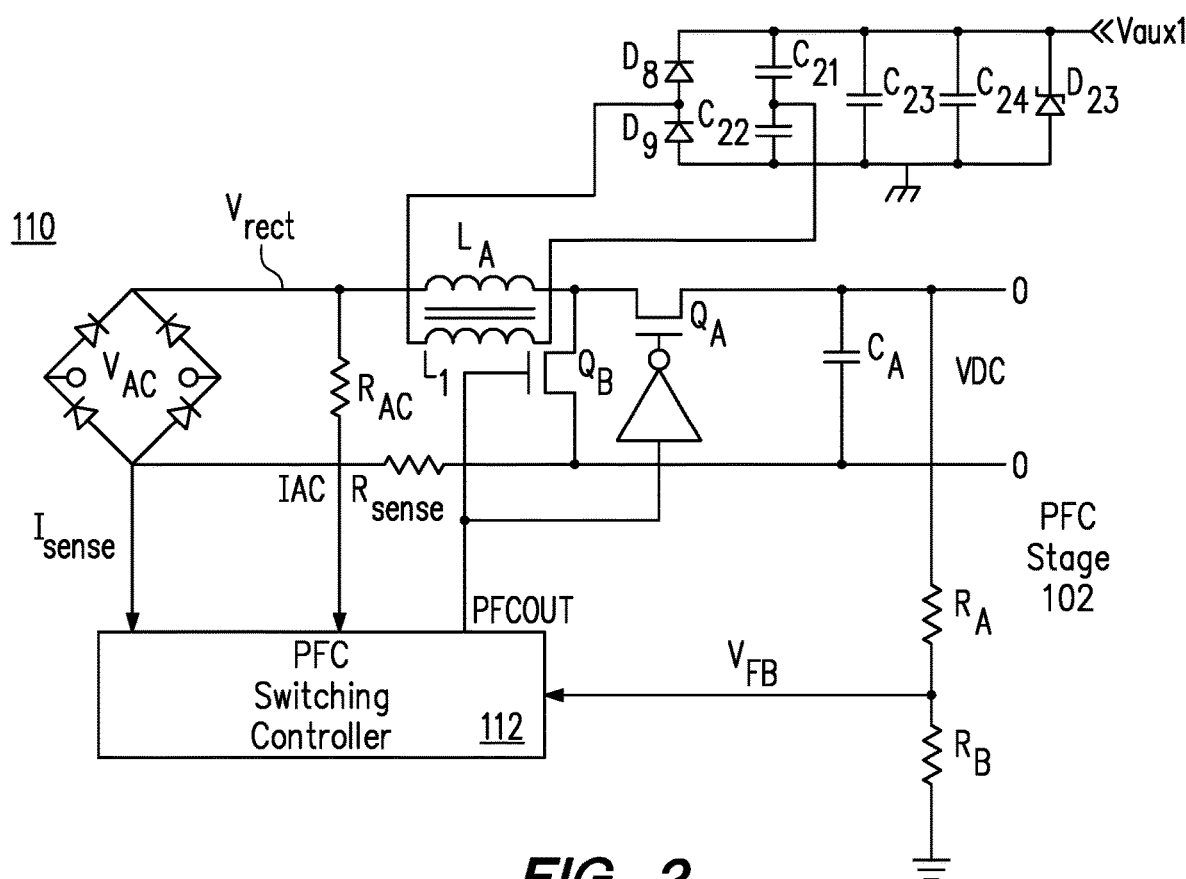
FIG. 2 illustrates a schematic diagram of a power factor correction circuit in accordance with an embodiment of the present invention.

FIG. 2 illustrates a schematic diagram of a power factor correction (PFC) circuit 102 in accordance with an embodiment of the present invention. An alternating-current (AC) input source $V_{AC}$ is coupled across input terminals of a bridge rectifier 110. A rectified input voltage signal Vrect is formed at a first output terminal of the rectifier 110 and is coupled to a first terminal of a main PFC inductor $L_A$ and to a first terminal of a resistor $R_{AC}$. A second terminal of the inductor $L_A$ is coupled to a first terminal of a transistor switch QA and to a first terminal of a transistor switch $Q_B$. A second terminal of the switch $Q_B$ is coupled to a first terminal of an output capacitor $C_A$. A second terminal of the switch $Q_A$ and a second terminal of the capacitor $C_A$ are coupled to a ground node.

A second terminal of the resistor $R_{AC}$ is coupled to a voltage sensing input of a PFC switching controller 112. A voltage sensing current signal $I_{AC}$ which is representative of the rectified input voltage Vrect flows through the resistor $R_{AC}$ and is received by the controller 112. A second output terminal of the bridge rectifier 110 is coupled to a current sensing input of the controller 112 and to a first terminal of a resistor Rsense. A second terminal of the resistor Rsense is coupled to the ground node. A signal Isense that is representative of the current input to the power factor correction circuit 102 is received by the controller 112.

An output voltage sensing signal VFB is formed by a resistor $R_A$ having a first terminal coupled to the output voltage $V_{DC}$ and a second terminal coupled to a first terminal of resistor $R_B$. A second terminal of the resistor $R_B$ may be coupled a ground node. The resistors $R_A$ and $R_B$ form a voltage divider in which the signal VFB is formed at the node between the resistors $R_A$ and $R_B$. The signal VFB is representative of the output voltage $V_{DC}$.

The PFC switching controller 112 generates a signal $PFC_{OUT}$ which controls the opening and closing of the switches QA and $Q_B$ so as to regulate the intermediate output voltage $V_{DC}$ while maintaining the input current in phase with the input voltage $V_{AC}$. To accomplish this, the controller 112 uses the signal VFB, as well as the input current and voltage sensing signals $I_{AC}$ and Isense. The switches $Q_A$ and $Q_B$ are operated such that when one is opened, the other is closed.

An inductor $L_1$ is inductively coupled to the main PFC inductor $L_A$. As described above, operation of the switches $Q_A$ and $Q_B$ causes current to flow in the inductor $L_A$. This also induces a current in the inductor $L_1$. This induced current is rectified by diodes $D_1$ and $D_2$ and charges capacitors $C_{21}$, $C_{22}$, $C_{23}$ and $C_{24}$ to form a DC auxiliary power supply voltage Vaux1. A Zener diode $D_{23}$ limits Vaux1, for example, to a maximum level of 35 volts. The auxiliary power supply voltage Vaux1 can provide power to operate the circuitry of the power supply, for example, a controller for the DC-to-DC converter stage 104.

Figure 3:
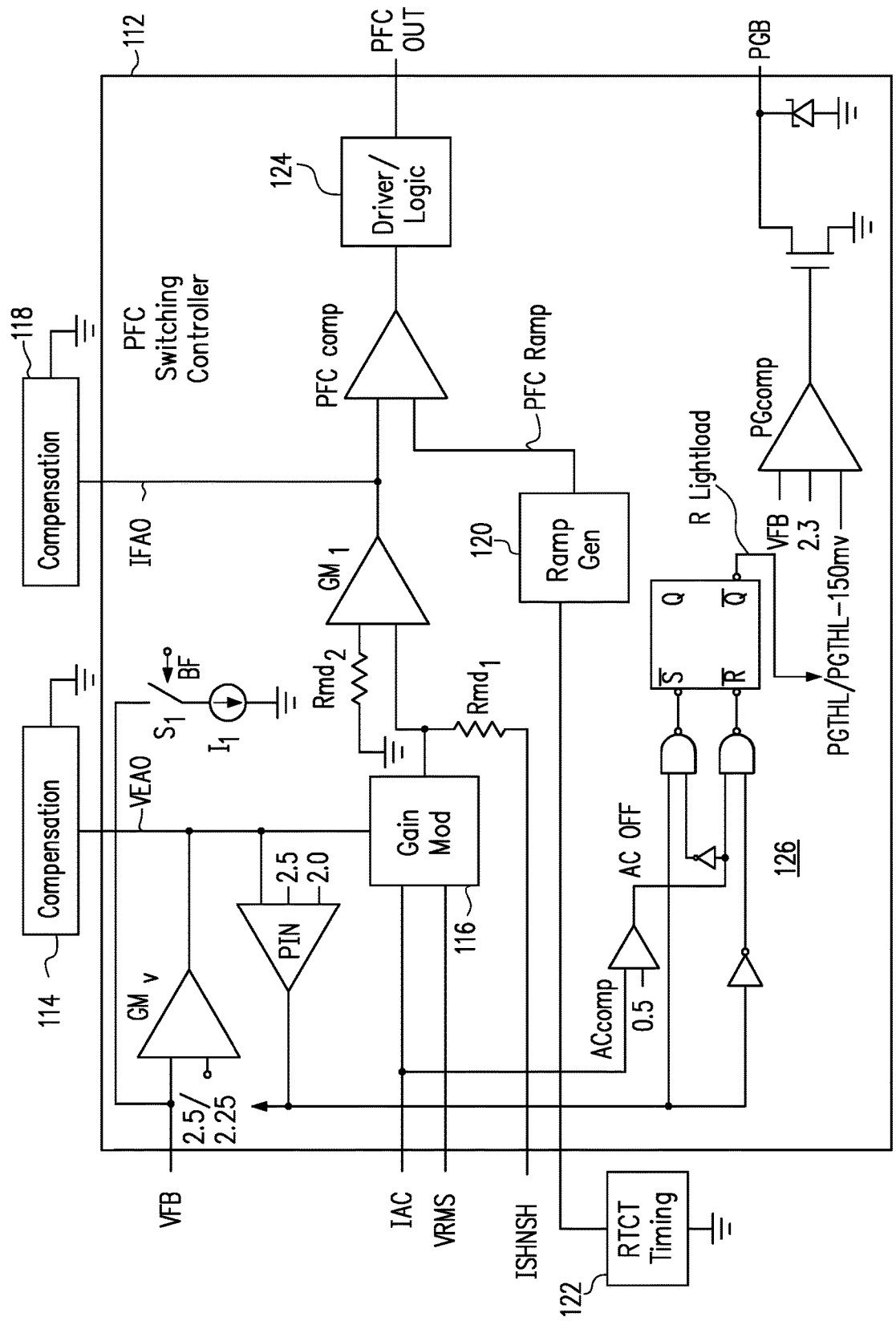
FIG. 3 illustrates a block schematic diagram of a controller for a power factor correction circuit in accordance with an embodiment of the present invention.
Figure 4A:
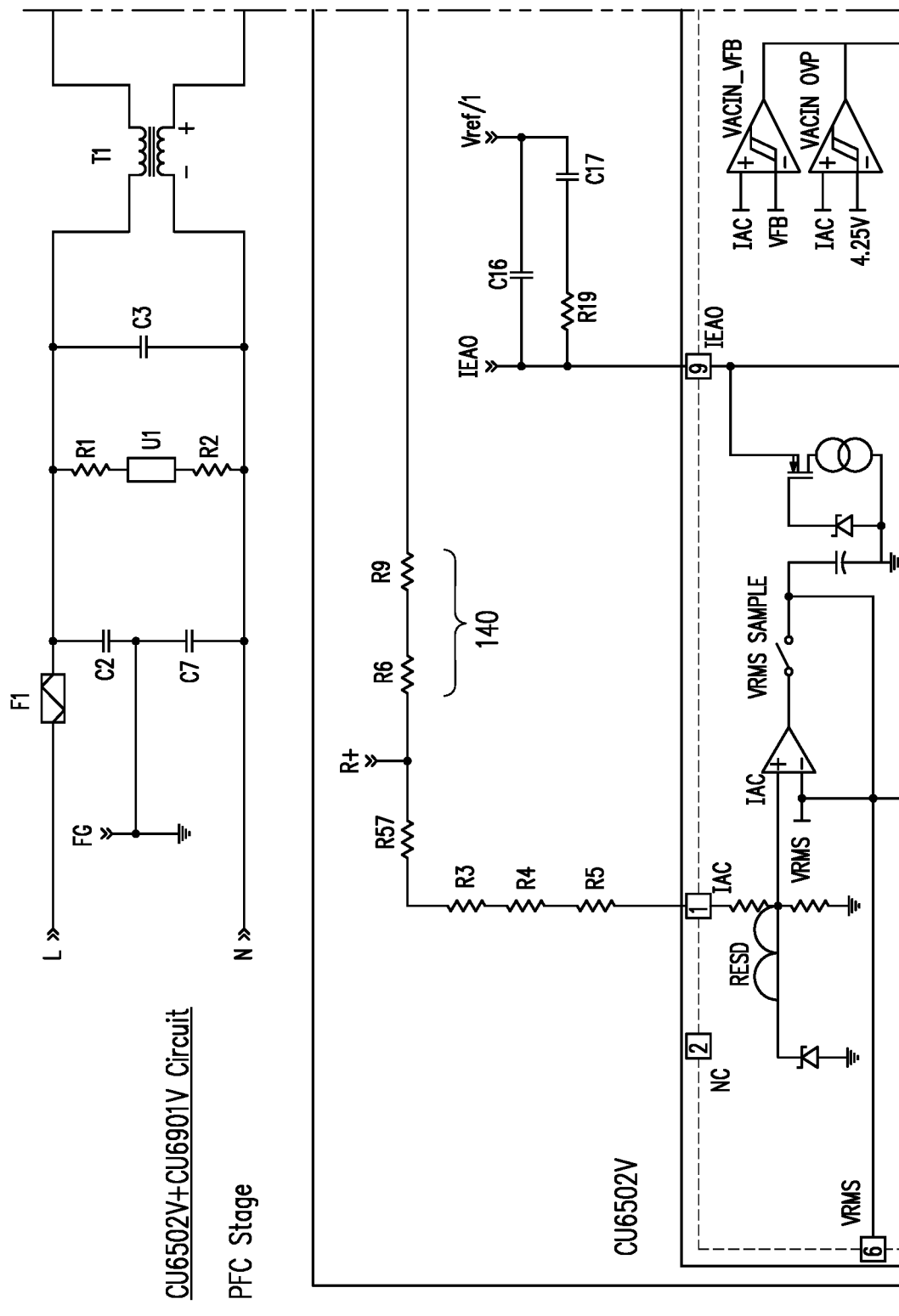
FIG. 4A-D illustrates a detailed schematic diagram of a PFC converter and PFC controller in accordance with an embodiment of the present invention.
Figure 4B:
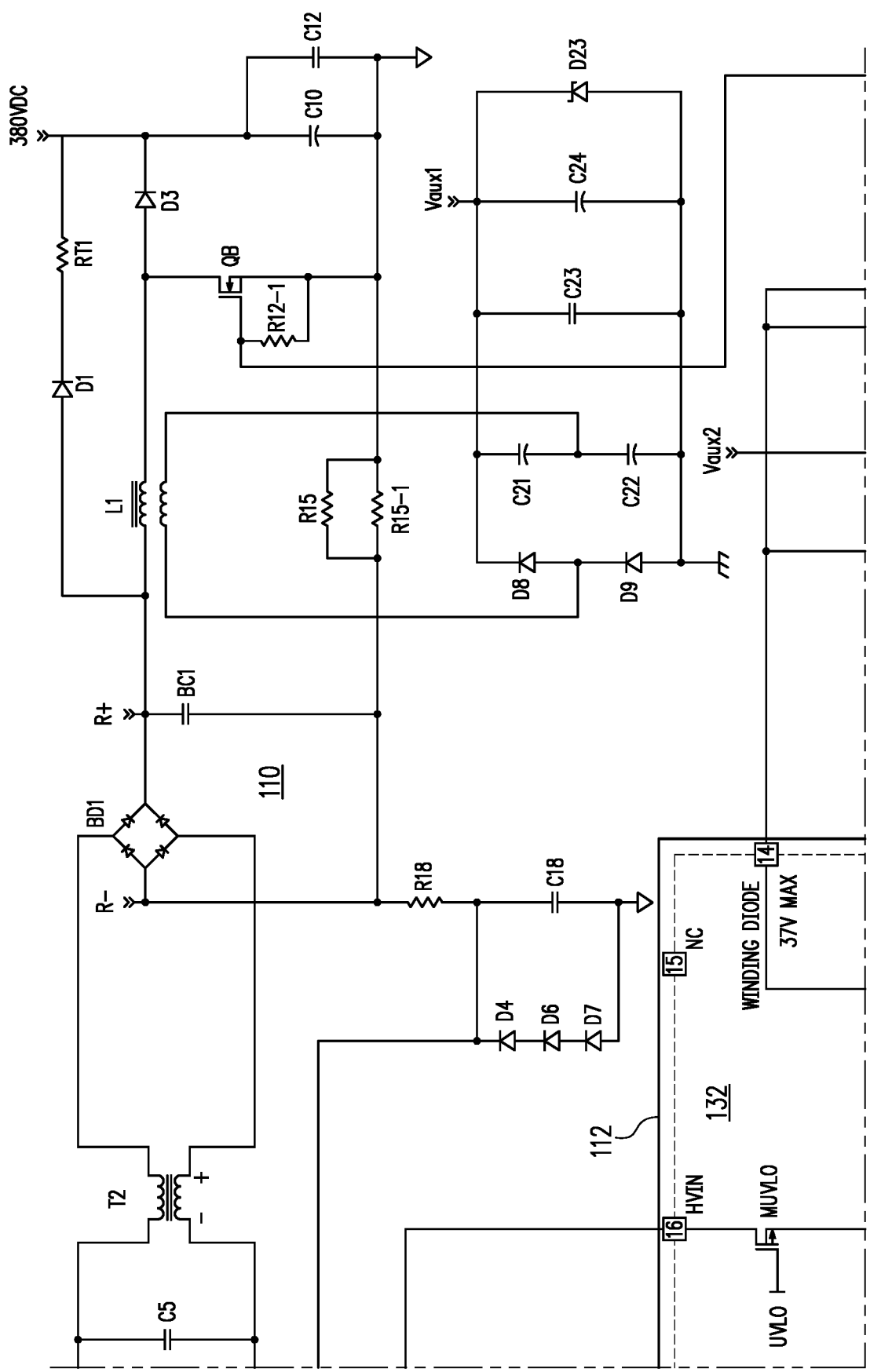
Figure 4C:
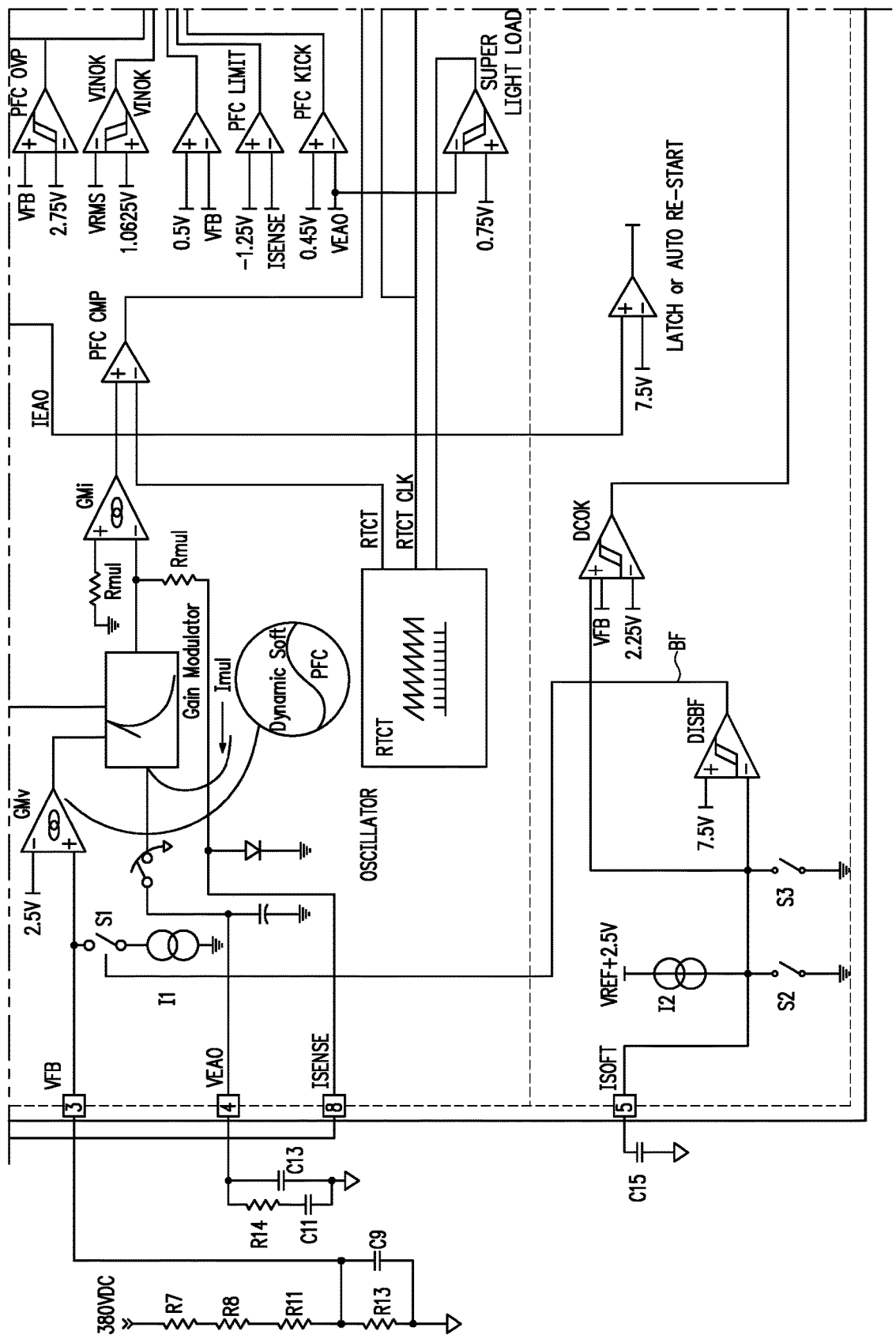
Figure 4D:
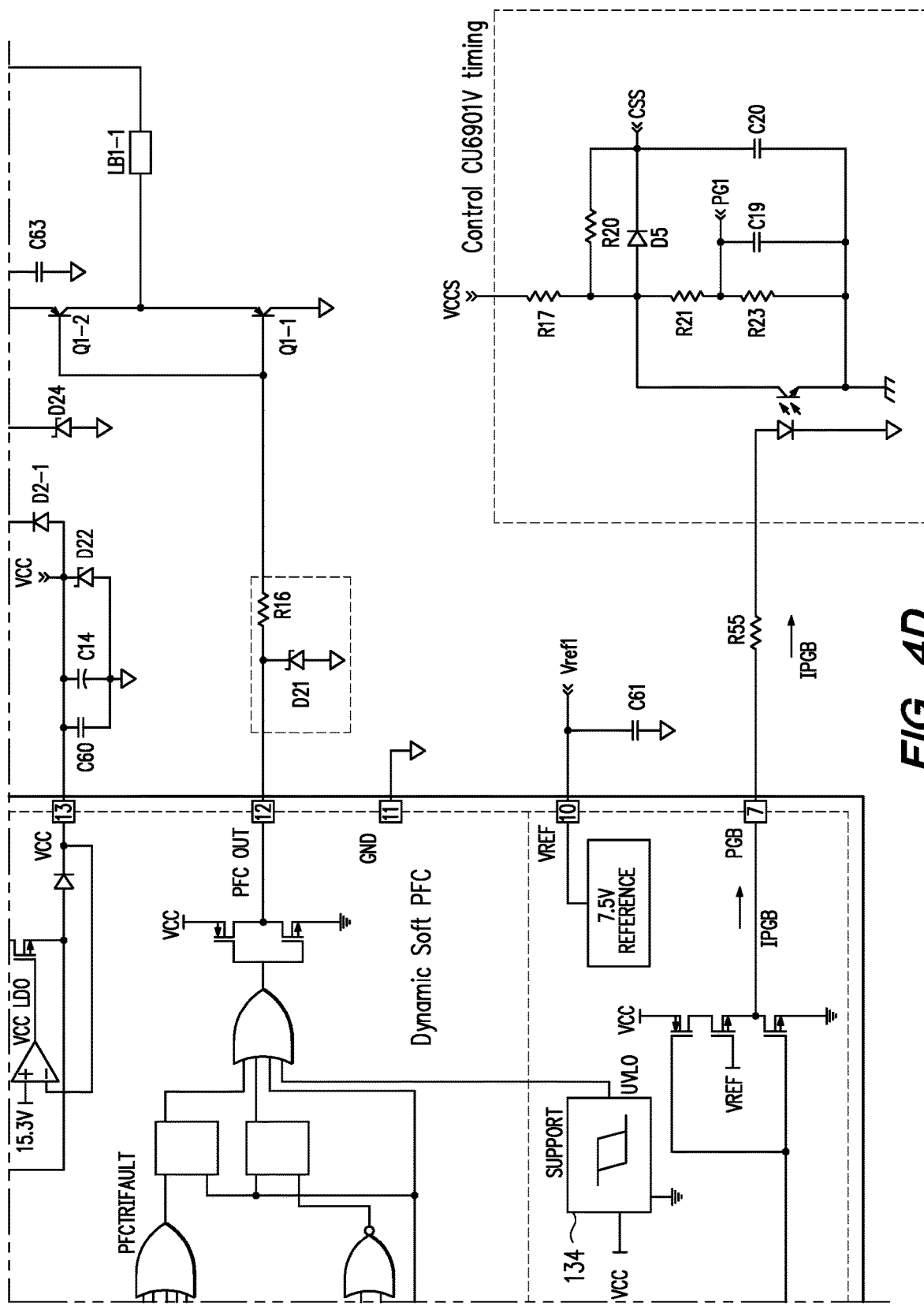

FIG. 3 illustrates a block schematic diagram of the PFC switching controller 112 in more detail in accordance with an embodiment of the present invention. Within the controller 112, the signal VFB is coupled to a first input terminal of a transconductance error amplifier GMv. A second input of the error amplifier GMv is coupled to a reference voltage that is representative of a desired level for the output voltage $V_{DC}$. This reference voltage may be 2.25 volts or 2.5 volts, depending upon the output level of a comparator PIN. An output of the error amplifier GMv forms a signal VEAO, which is an error signal that is representative of a difference between the actual level of the output voltage $V_{DC}$ and a desired level for the output voltage. As shown in FIG. 3, the error signal VEAO is formed across a compensation circuit 114.

In an embodiment, the reference voltage of 2.5 volts corresponds to a target level of 380 volts DC for the PFC output $V_{AC}$, while the reference voltage of 2.25 corresponds to a target level of 342 volts DC for the PFC output $V_{DC}$. It will be apparent that different levels can be selected, for example, by changing the reference voltage levels.

As shown in FIG. 3, the feedback signal VFB at the first input terminal of the transconductance error amplifier GMv is also coupled to a controllable or switched current source. More particularly, the feedback signal VFB is coupled to a first terminal of a switch $S_1$. A second terminal of the switch $S_1$ is coupled to a first terminal current source $I_1$. A second terminal of the current source $I_1$ is coupled to a ground node. When the switch $S_1$ is closed, a current passes through the current source $I_1$ which lowers the voltage level of VFB. This voltage drop is caused by the current being pulled through the feedback resistor $R_A$ (FIG. 2). As a result, the target level for the PFC output $V_{DC}$ is increased. The current source $I_1$ can be activated upon start-up of the power supply and deactivated during steady-state operation.

The switch $S_1$ can be activated by a signal BF, described in more detail in connection with FIG. 4A-D. The signal BF preferably closes the switch $S_1$, and thereby activates the current source $I_1$, upon start-up of the power supply. The signal BF also preferably opens the switch $S_1$, and thereby disables the current source $I_1$, during steady-state operation of the power supply.

In an embodiment, the target level for $V_{DC}$ is increased to 440 volts during start up. In this example, $R_A$ can be 6.0 mega-ohms while the current source $I_1$ can be 10 microamps; in this case, the increase to $V_{DC}$ is 60 volts (6.0 MΩ×10 uA=60 volts). It will be apparent that a different level for $V_{DC}$ can be selected. For example, different values for $R_A$ and $I_1$ can be selected. As a another specific example, $R_A$ can be set to 20 MΩ so that the increase to $V_{DC}$ is 200 volts (20.0 MΩ×10 uA=200 volts); in this case, the initial target level for $V_{DC}$ can be 580 volts (380 volts+200 volts=580 volts).

The comparator PIN determines whether the PFC circuit 102 is operating under light load conditions or heavy loading conditions (i.e. loading conditions other than light load) according to the level of the error signal VEAO. When the level of the error signal VEAO is less than 2.0 volts, this indicates light load conditions; in this case, the output of the comparator PIN is a logic low voltage. If the level of the error signal VEAO then exceeds 2.5 volts, this indicates heavy loading conditions; in this case, the output of the comparator PIN changes to a logic high voltage. If level of the error signal VEAO then falls below 2.0 volts, this again indicates light load conditions; in this case, the output of the comparator PIN changes back to a logic low voltage. Thus, the comparator PIN preferably operates with hysteresis to inhibit its output from transitioning under slight changes in loading. The output of the comparator PIN is a signal labeled "Heavy Load." In this way, the state of the load can be determined by monitoring for changes in the level of $V_{DC}$. More particularly, the state of the load can be determined by monitoring the error signal VEAO.

When the output of the comparator PIN is a logic high voltage (heavy loading), the reference voltage coupled to the error amplifier GMv is 2.5 volts, which causes the output voltage VDC to be regulated at approximately 380 volts DC. When the output of the comparator PIN is a logic low voltage (light loading), the reference voltage coupled to the error amplifier GMv is preferably 2.25 volts, which causes the output voltage $V_{DC}$ to be regulated at approximately 342 volts DC. Thus, the level at which $V_{DC}$ is regulated by the PFC stage 102 can be different depending upon the loading.

A gain modulation block 116 receives the error signal VEAO, as well as the signal IAC and a signal VRMS for generating a modulated error signal Imul. The signals VEAO and IAC are described above. The signal VRMS is representative of the level of the AC line voltage and is used to inhibit switching in the PFC stage 102, by gradually pulling down the level of the error signal VEAO, if the AC line voltage is too low for an extended period (i.e. under "brown out" conditions).

The output of the gain modulation block 116 is coupled to a first input terminal of a transconductance amplifier GMi and to a first terminal of a resistor Rmul1. A second terminal of the resistor Rmul1 is coupled to receive the signal Isense. A first terminal of a resistor Rmul2 is coupled to a second input terminal of the amplifier GMi. A second terminal of a resistor Rmul2 is coupled to a ground node.

An output of the amplifier GMi is coupled to a compensation circuit 118. A signal IEAO is formed at the output of the amplifier GMi. The signal IEAO is representative of the error signal VEAO as well as the input voltage and current to the PFC stage. The signal IEAO is coupled to a first input of the comparator PFCcomp. An output of a ramp generator 120 forms a ramp signal PFC ramp which is coupled to a second terminal of the comparator PFCcomp. An RTCT node of the ramp generator 120 is coupled to an RTCT timing network 122 which sets the frequency of the ramp signal.

An output of the comparator PFCcomp is coupled to driver/logic block 124 which includes driver and logic circuit elements for forming the PFC switching signal PFCOUT. It will be apparent that the PFC function and control of switching in the PFC stage 102 can be accomplished in other ways and by employing different circuit arrangements.

The signal IAC is coupled to a first input of a comparator ACcomp while a reference voltage of 0.5 volts is coupled a second input of the comparator ACcomp. The comparator ACcomp generates a signal ACOFF at its output, which indicates whether the input voltage has fallen below a minimum threshold. Logic 126 combines the signal ACOFF with the signal at the output of the comparator PIN to form a signal R Light Load ("Remember Light Load"). The signal R Light Load is a logic signal that indicates the state of the signal when the signal IAC is above its minimum threshold and saves its state whenever the signal IAC falls below its minimum threshold as detected by the comparator ACcomp. In other words, the logic 126 remembers (by holding the state of the signal R Light Load) whether power converter 100 was under light or heavy loading conditions at the time that the AC input signal is lost.

The signal R Light Load is used to adjust the level of a threshold voltage applied to a power gate comparator PGcomp. More particularly, a first input of the comparator PGcomp is coupled to receive the feedback signal VFB. A second input of the comparator PGcomp is coupled to receive a first reference voltage of 2.3 volts and a third input is coupled to receive a second reference voltage. The level of the second reference voltage changes dependent upon the level of the signal R Light Load. More particularly, a reference voltage PGTHL is coupled to the third input of the comparator when R Light Load indicates that the power converter 100 was under heavy loading conditions at the time that the AC input signal is lost; and, a reference voltage PGTHL-150 mV is coupled to the third input of the comparator when R Light Load indicates that the power converter 100 was under light loading conditions at the time that the AC input signal is lost. The level of PGTHL may be set to 2.0 volts so that the second reference voltage is 2.0 or 1.85 volts depending on the level of R Light Load.

The output of the comparator PGcomp is coupled to the DC-to-DC converter 104 (FIG. 3) to selectively disable switching in the DC-to-DC converter 104 via the signal PGB (also shown in FIG. 3). More particularly, immediately upon start-up of the PFC stage, the level of VFB is low and begins to rise. While the level of VFB is below 2.3. volts, the level of PGB is a logic high voltage, which causes switching in the DC-to-DC converter to be disabled. Once the level of VFB the surpasses the level of the first reference voltage (e.g. 2.3 volts), this causes the level of PGB to change to a logic low voltage, which causes switching in the DC-to-DC converter to be enabled. Then, for the level of PGB to change again to a logic high voltage, the level of VFB needs to fall below the level of the second reference voltage. The level of the second reference voltage can be equal to 2.0 volts (PGTHL) or 1.85 volts (PGTHL-150 Mv), depending upon the level of R Light Load.

Thus, switching in the in the DC-to-DC converter is disabled under different different conditions, which conditions depend upon the state of the load at the time the line voltage was lost. More particularly, when the power converter 100 is operating under heavy loading conditions, the level of VFB is regulated to 2.5 volts and the second reference voltage at the comparator PGcomp is 2.0 volts. If the AC line voltage is then lost, the level of VFB will begin to fall; in this case, it will need to fall from 2.5 volts to 2.0 volts before the output of the comparator PGcomp causes the signal PGB to disable switching in the DC-to-DC converter 104. However, when the power converter 100 is operating under light load, the level of VFB is regulated to 2.25 volts and the second reference voltage at the comparator PGcomp can be 1.85 volts; if the AC line voltage is then lost, the level of VFB will begin to fall; in this case, it will need to fall from 2.25 volts to 1.85 volts before the output of the comparator PGcomp causes the signal PGB to disable switching in the DC-to-DC converter 104. In this way, the hold-up time for power loss under heavy loading conditions is controlled differently the hold-up time for power loss under light loading conditions. Because the hold-up times are controlled differently, differences in the way the power supply operates under light or heavy loads can be compensated so that the hold-up times are of a desired duration. The disabling of the switching can be performed such that the hold-up times are approximately the same for both light and heavy loads. This is because the time required for the level of VFB to fall from 2.5 volts to 2.0 volts under heavy loading conditions is expected to be approximately the same as the time required for the level of VFB to fall from 2.25 volts to 1.85 volts under light loading conditions. Alternatively, the disabling of the switching can be performed such that the hold-up times are different for light and heavy loads.

FIG. 4A-D illustrates a detailed schematic diagram of a PFC converter and PFC controller in accordance with an embodiment of the present invention. FIG. 4A-D shows circuitry that can be used to generate the signal BF, described above in connection with FIG. 3. As shown in FIG. 4A-D, a soft-start signal ISOFT is generated by charging a capacitor $C_{15}$ with a current source $I_2$ upon start-up of the switching power supply. More particularly, switches $S_2$ and $S_3$ are initially closed. When a reference voltage Vref rises to a predetermined level, the switch $S_2$ is opened. When an AC input voltage is detected, the switch $S_3$ is opened. When the switches $S_2$ and $S_3$ are open, a voltage across the capacitor $C_{15}$ slowly rises. While the voltage across $C_{15}$ rises, the switch $S_1$ is held closed by a comparator DISBF, which sets the target level of the PFC output $V_{DC}$ to its higher, initial level for start-up (e.g., 440 volts DC). When the voltage across C15 rises to 7.5 volts, the comparator DISBF opens the switch S1 which sets the target level of the PFC output $V_{DC}$ to its lower, steady-state level (e.g. 380 volts). The comparator DISBF preferably has hysteresis so as to prevent oscillation in the signal BF.

Figure 5:
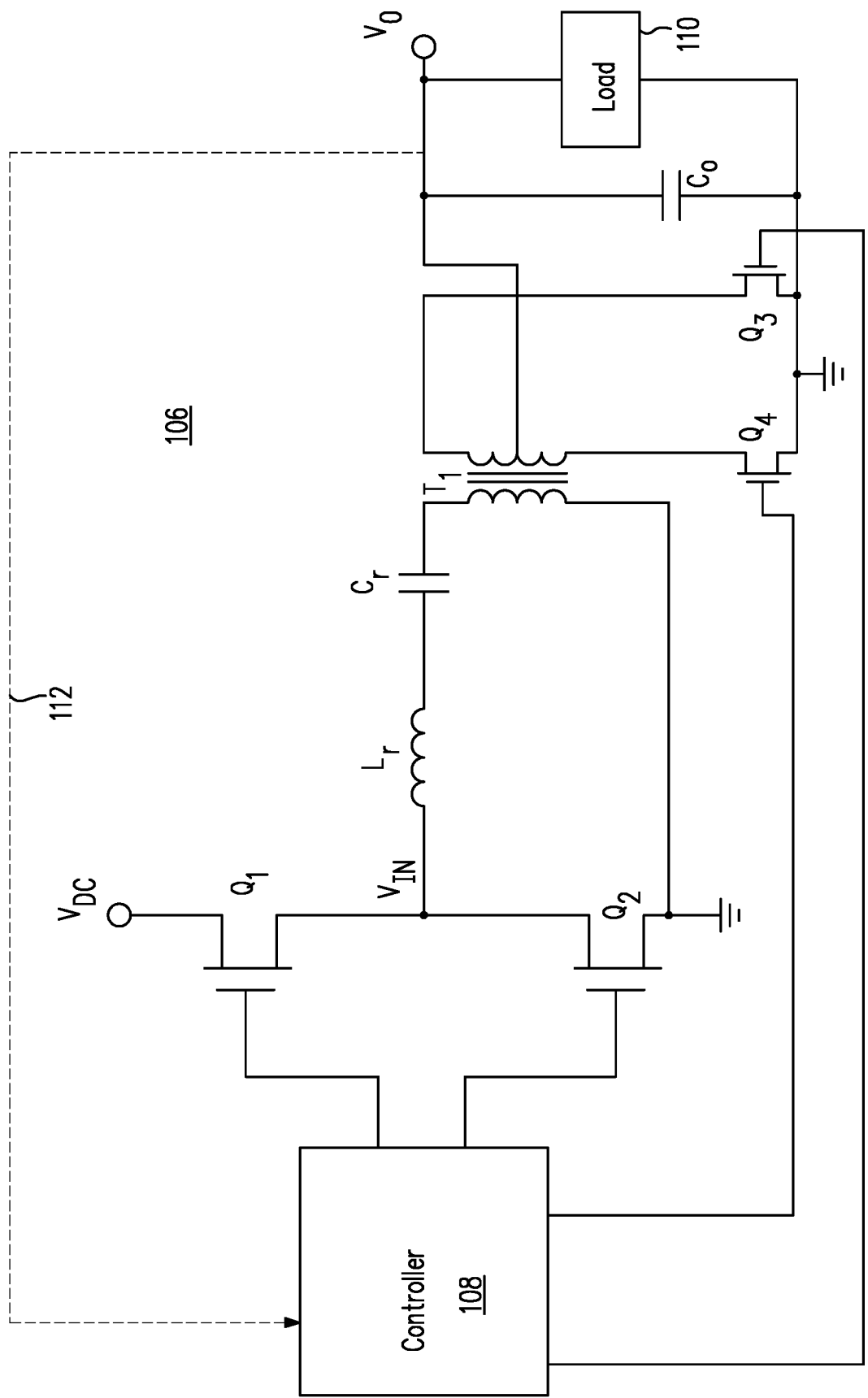
FIG. 5 illustrates a schematic diagram of a resonant switching converter in accordance with an embodiment of the present invention.

FIG. 5 illustrates a schematic diagram of a resonant switching converter 106 in accordance with an embodiment of the present invention. The resonant switching converter 106 may be, for example, included in the DC-to-DC converter 104 of FIG. 1. Referring to FIG. 5, the converter 106 includes a half-bridge switching inverter that includes a pair of series-connected transistor switches $Q_1$ and $Q_2$. A power source, such as the output $V_{DC}$ generated by the PFC stage 102 (FIG. 1), is coupled to a first terminal of the transistor switch $Q_1$. A second terminal of the transistor switch $Q_1$ is coupled to a first terminal of a transistor switch $Q_2$ to form an intermediate node. The second terminal of the transistor switch $Q_2$ is coupled to a ground node. A control terminal of each of the transistor switches $Q_1$ and $Q_2$ is coupled to a controller 108. The controller 108 controls opening and closing of the pair of transistor switches $Q_1$ and $Q_2$. When the switch $Q_1$ is closed and the switch $Q_2$ is open, the intermediate node is coupled to $V_{DC}$. This raises a voltage, VIN, at the intermediate node. When the switch $Q_1$ is open and the switch $Q_2$ is closed, the intermediate node is coupled to ground. This lowers the voltage, VIN, at the intermediate node. While FIG. 2 shows a half-bridge switching inverter, it can be replaced with a full-bridge switching inverter.

Energy storage elements are coupled to the intermediate node. Particularly, as shown in FIG. 5, a first terminal of an inductor $L_r$ is coupled to the intermediate node. A second terminal of the inductor $L_r$ is coupled to a first terminal of a capacitor $C_r$. The energy storage elements, $L_r$ and $C_r$, form a series resonant tank. The resonant tank is charged with energy by raising and lowering the voltage VIN at the intermediate node. A second terminal of the capacitor $C_r$ is coupled to a first terminal of a primary winding of a transformer $T_1$. A second terminal of the primary winding of the transformer $T_1$ is coupled to a ground node. A first terminal of a secondary winding of the transformer $T_1$ is coupled to a first terminal of a transistor switch $Q_3$. A second terminal of the secondary winding of the transformer $T_1$ is coupled to a first terminal of a transistor switch $Q_4$. A second terminal of the transistor switch $Q_3$ and a second terminal of the transistor switch $Q_4$ are coupled to a ground node. A control terminal of each of the transistor switches $Q_3$ and $Q_4$ is coupled to the controller 108. The controller 108 controls opening and closing of the pair of transistor switches $Q_3$ and $Q_4$.

A center tap of the secondary winding of the transformer $T_1$ is coupled to a first terminal of a capacitor $C_O$. A second terminal of the capacitor $C_O$ is coupled to a ground node. An output voltage, $V_O$, is formed across the capacitor $C_O$. A load 110 may be coupled across the capacitor $C_O$ to receive the output voltage $V_O$. The output voltage $V_O$, or a voltage that is representative of the output voltage, is fed back to the controller 108 via a feedback path 112.

Adjusting the switching frequency of the transistor switches $Q_1$ and $Q_2$ adjusts impedance of the resonant tank and, therefore, adjusts the amount of power delivered to the load 110. More particularly, decreasing the switching frequency tends to increase the power delivered to the load 110. Increasing the switching frequency tends to reduce the power delivered to the load 110. By monitoring the level of the output voltage $V_O$ via a feedback path 112, the controller 108 can adjust the switching frequency to maintain the output voltage $V_O$ constant despite changes in the power requirements of the load 110 and despite changes in the level of the input $V_{DC}$. This is referred to as frequency modulation or FM modulation.

As power is transferred to the load 110 via the transformer $T_1$, current through the secondary winding of the transformer $T_1$ alternates in direction. The transistor switches $Q_3$ and $Q_4$ perform synchronous rectification. This is accomplished by the controller 108 turning the transistor switches $Q_3$ and $Q_4$ on and off at appropriate times so that the current through each of the switches $Q_3$ and $Q_4$ is in one direction only. Generally, the transistor switch $Q_3$ is on while the transistor switch $Q_4$ is off. Similarly, the transistor switch $Q_4$ is on while the transistor switch $Q_3$ is off. Synchronous rectification ensures that power is delivered to the load 110 and prevents reverse currents which could be reflected to the resonant tank. Such reverse current could result in unwanted oscillations, intractable behavior and device failure.

As described herein, the inductor $L_1$ coupled to the main PFC inductor $L_4$ is used to generate auxiliary power during start-up (see e.g., FIGS. 2 and 4). This power is used to operate control circuitry of the power supply, such as the DC-to-DC converter controller 108. In accordance with a further aspect of the present invention, it is desired to inhibit drawing power in this manner after start-up. This is desirable in order to increase efficiency. Rather, during steady state operation, it is desired to draw power from an auxiliary output of the DC-to-DC converter stage 104 in order to provide power to control circuitry of the power supply.

Figure 6:
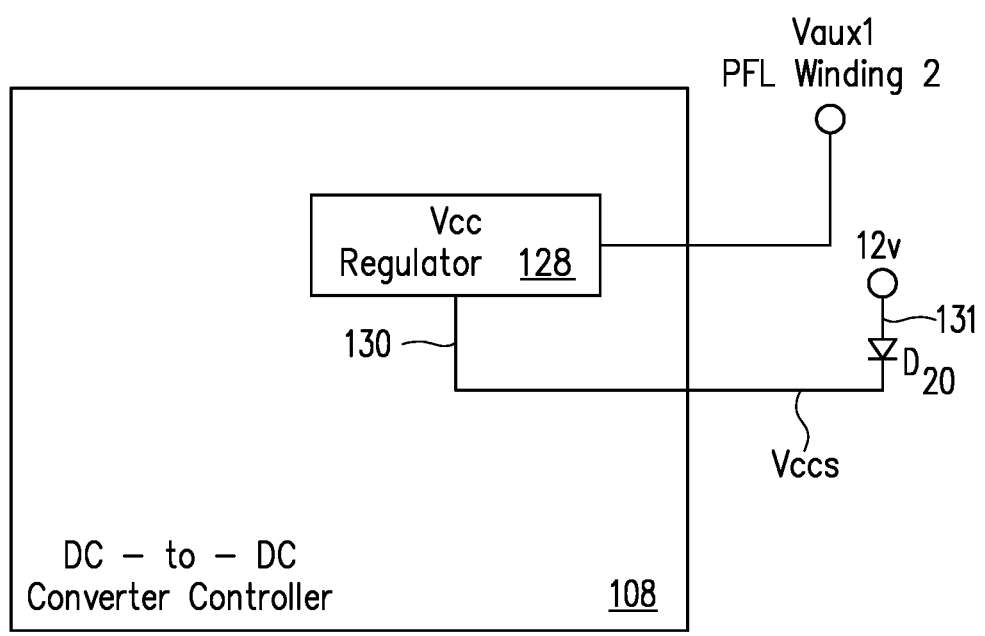
FIG. 6 illustrates a voltage regulator for a power supply controller in accordance with an embodiment of the present invention.
Figure 7A:
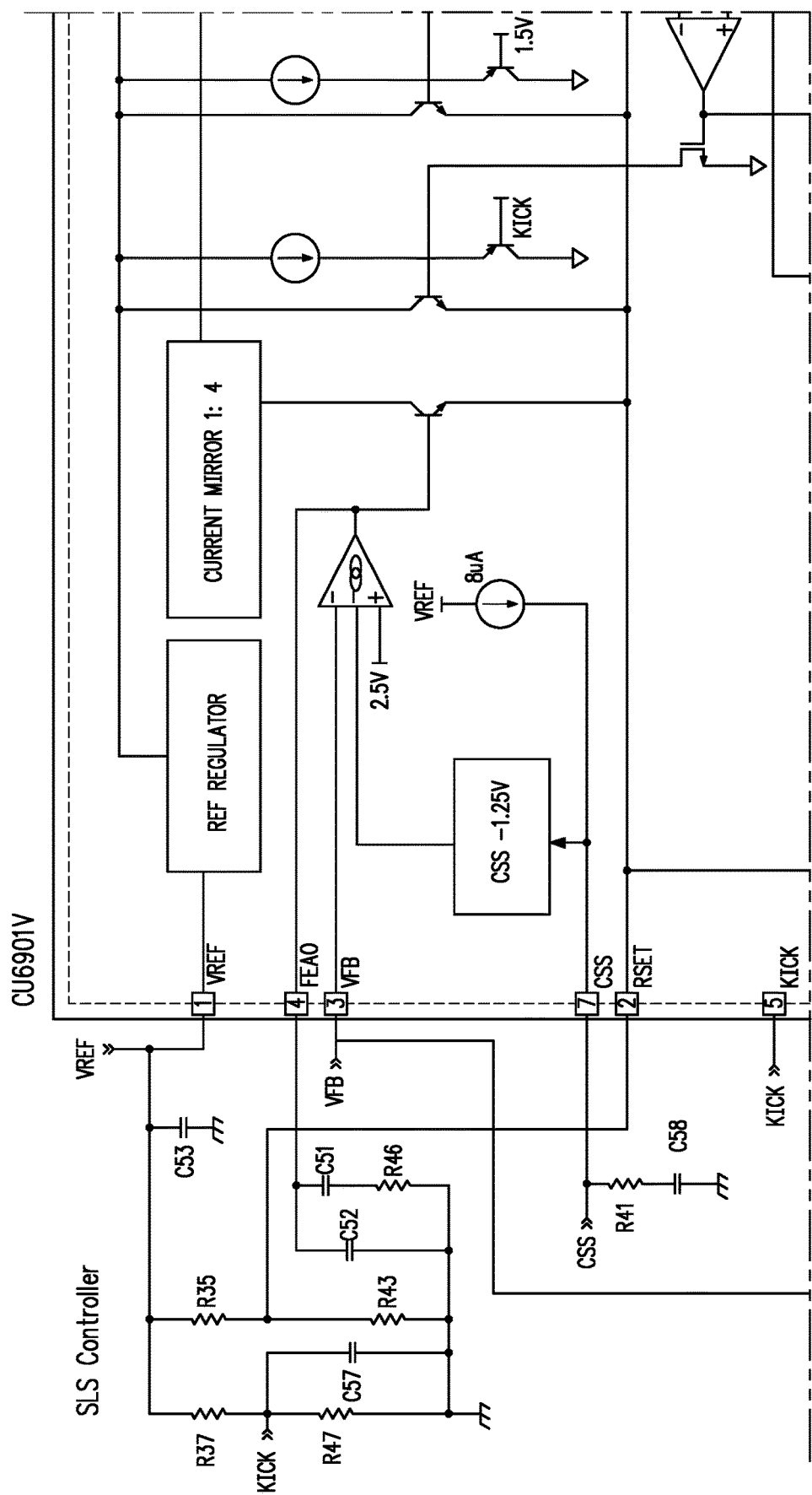
FIG. 7A-D illustrates a detailed schematic diagram of a DC-to-DC converter and DC-to-DC converter controller in accordance with an embodiment of the present invention.
Figure 7B:
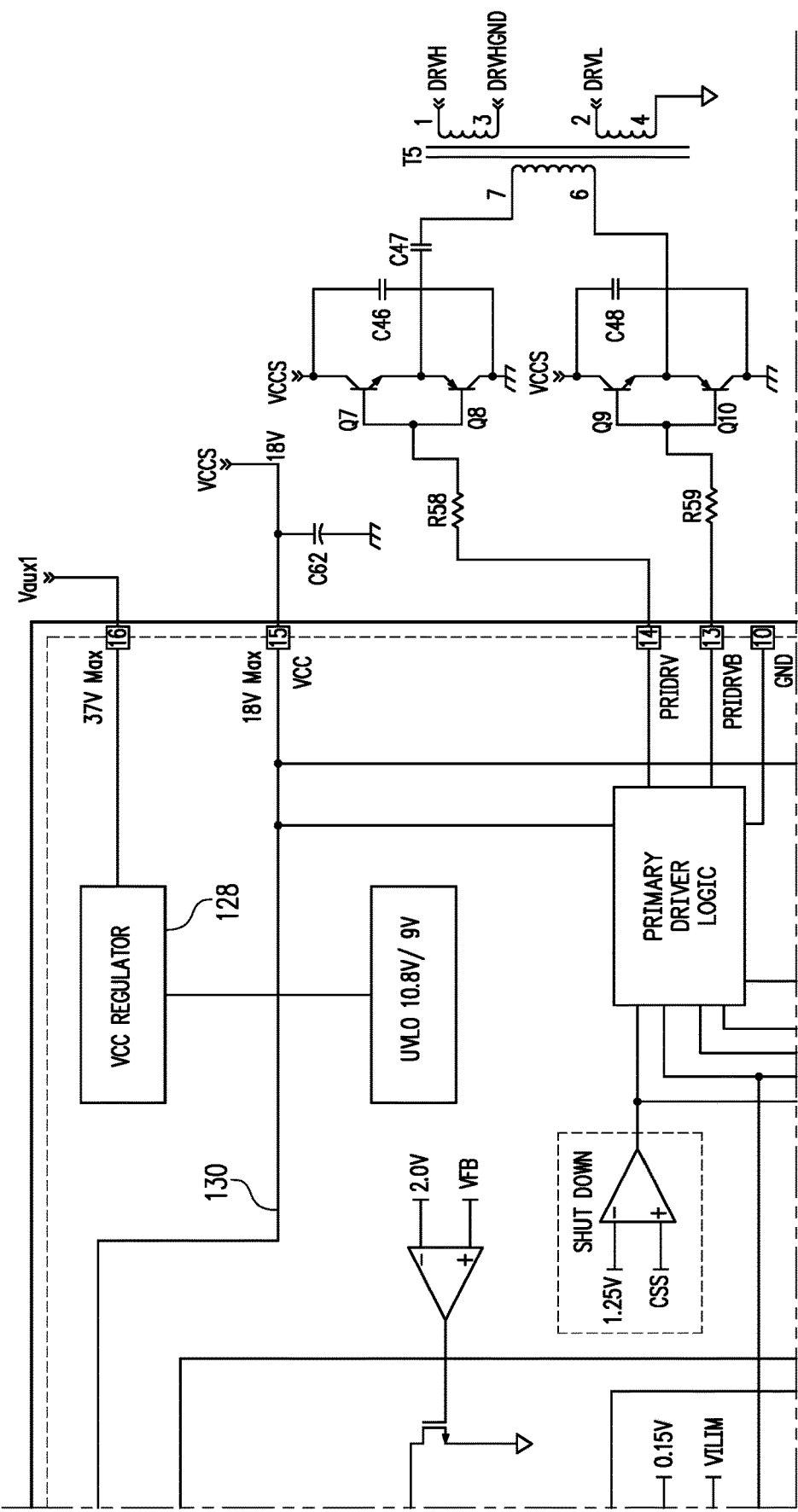
Figure 7C:
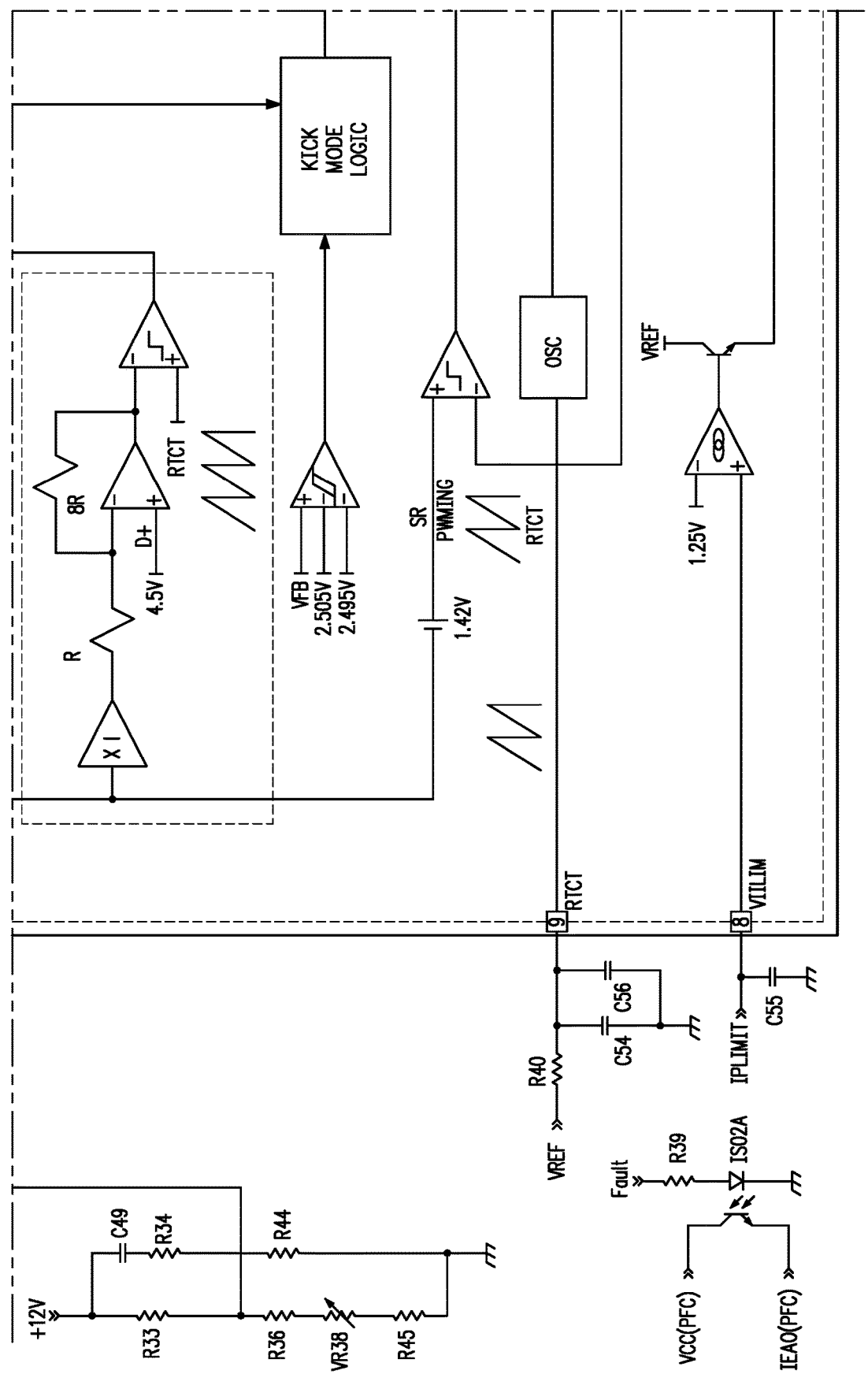
Figure 7D:
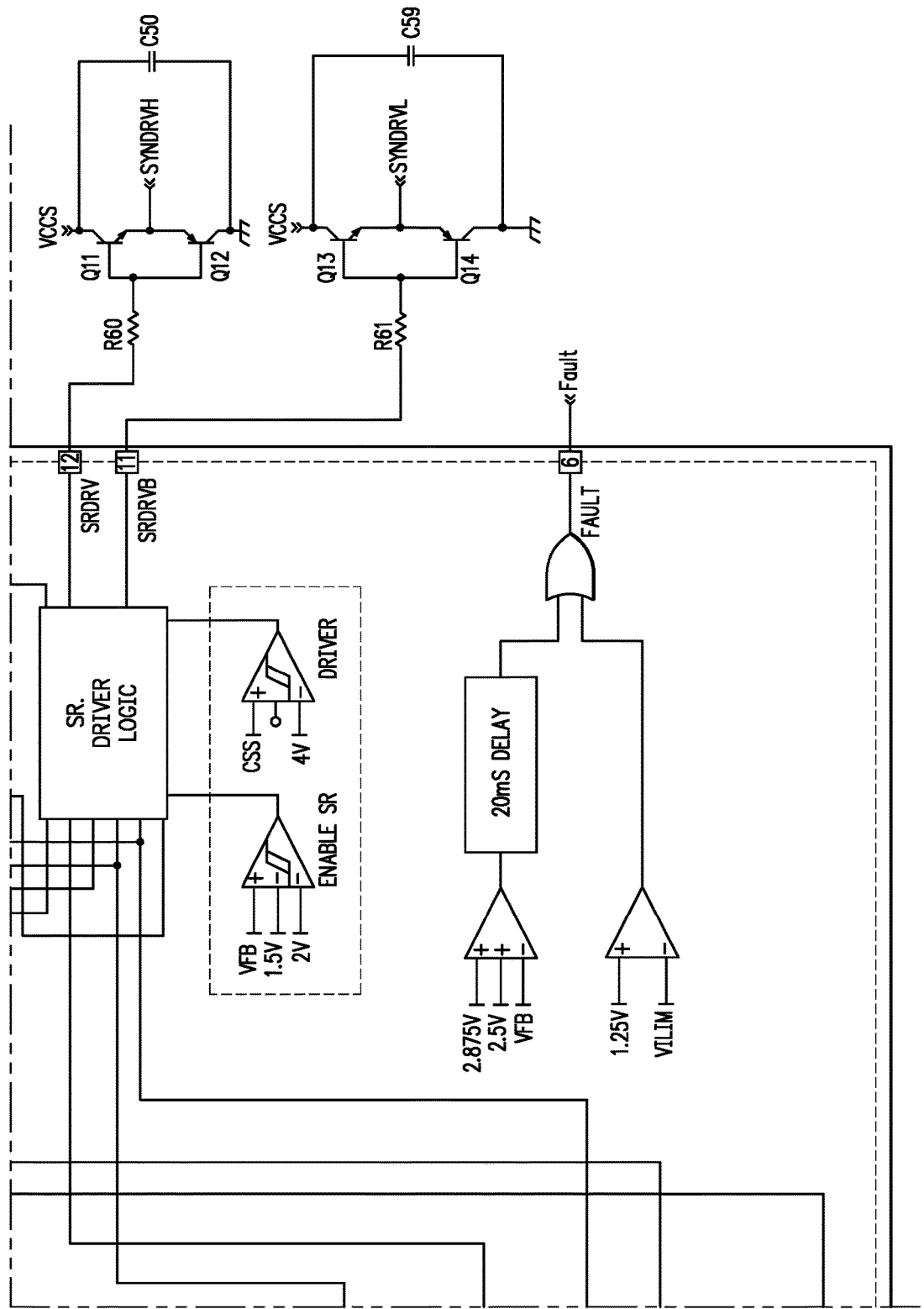
Figure 8A:
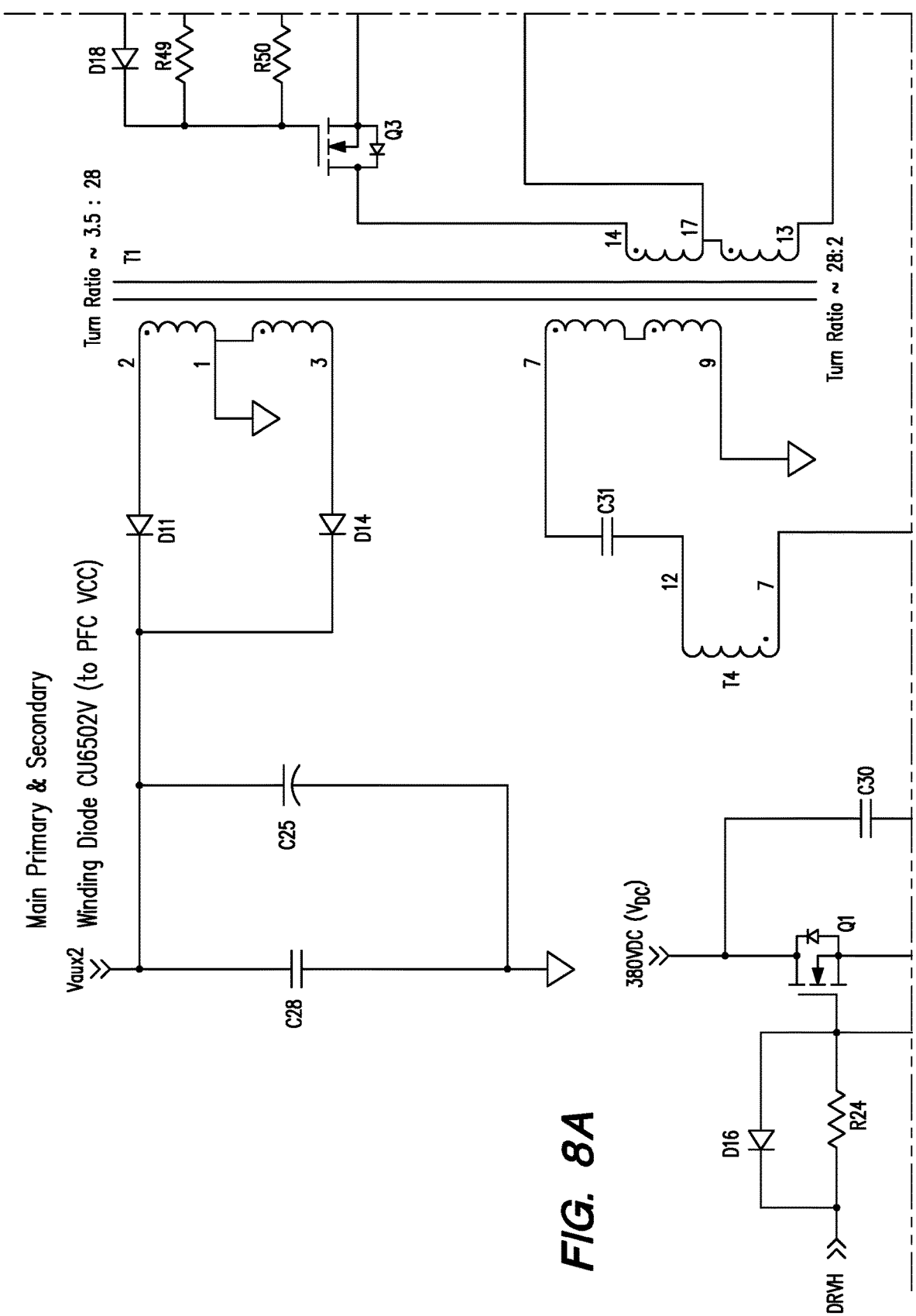
FIG. 8A-D illustrates DC-to-DC converter transformer circuitry in accordance with an embodiment of the present invention.
Figure 8B:
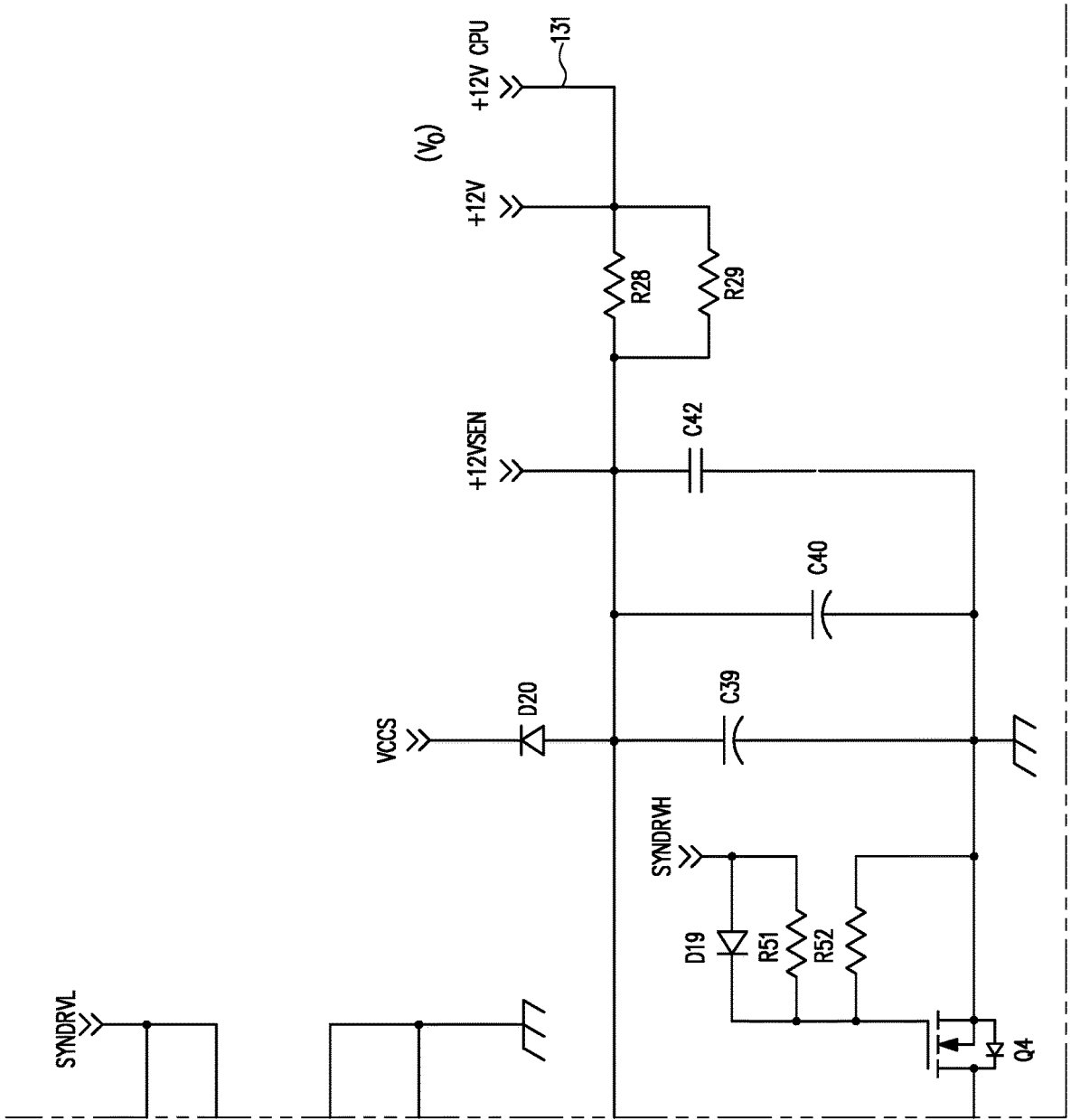
Figure 8C:
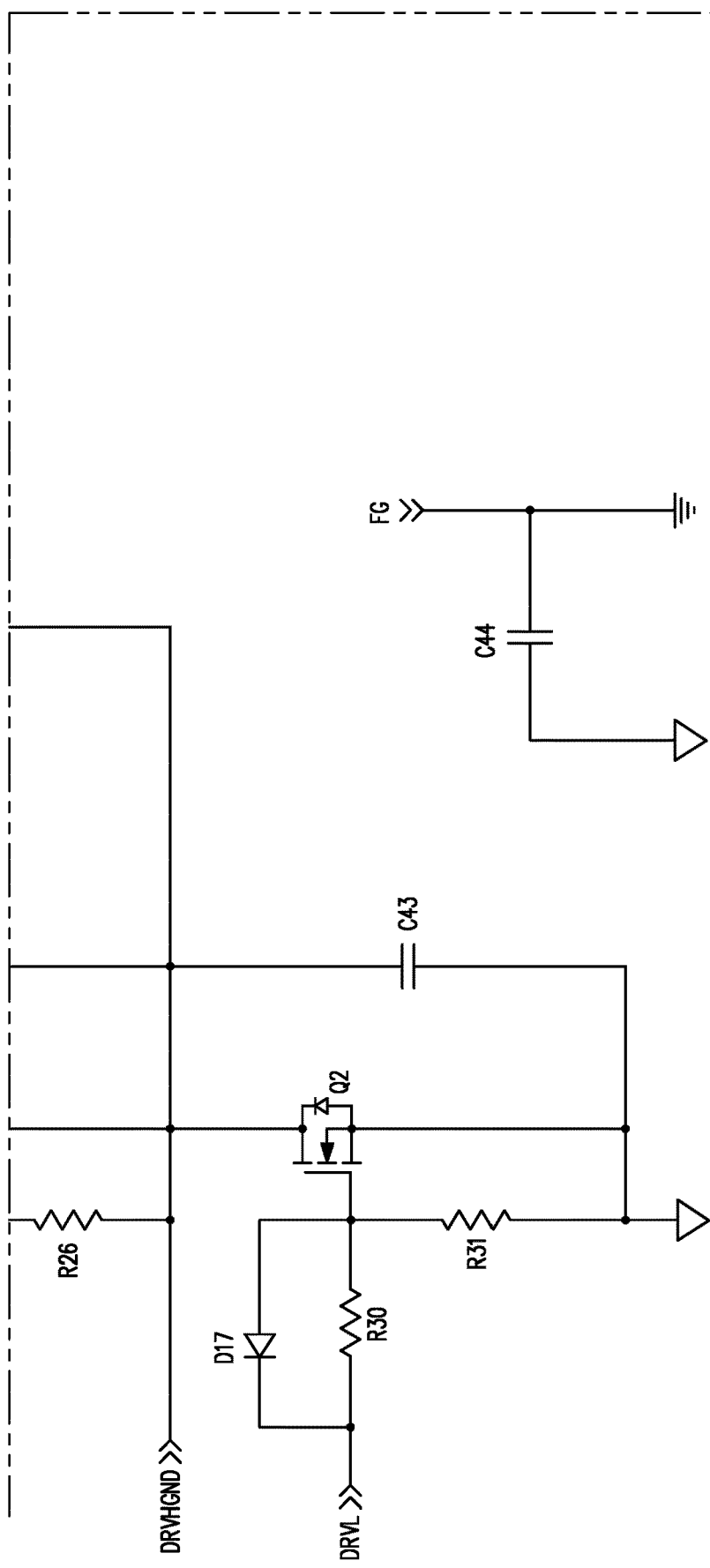
Figure 8D:
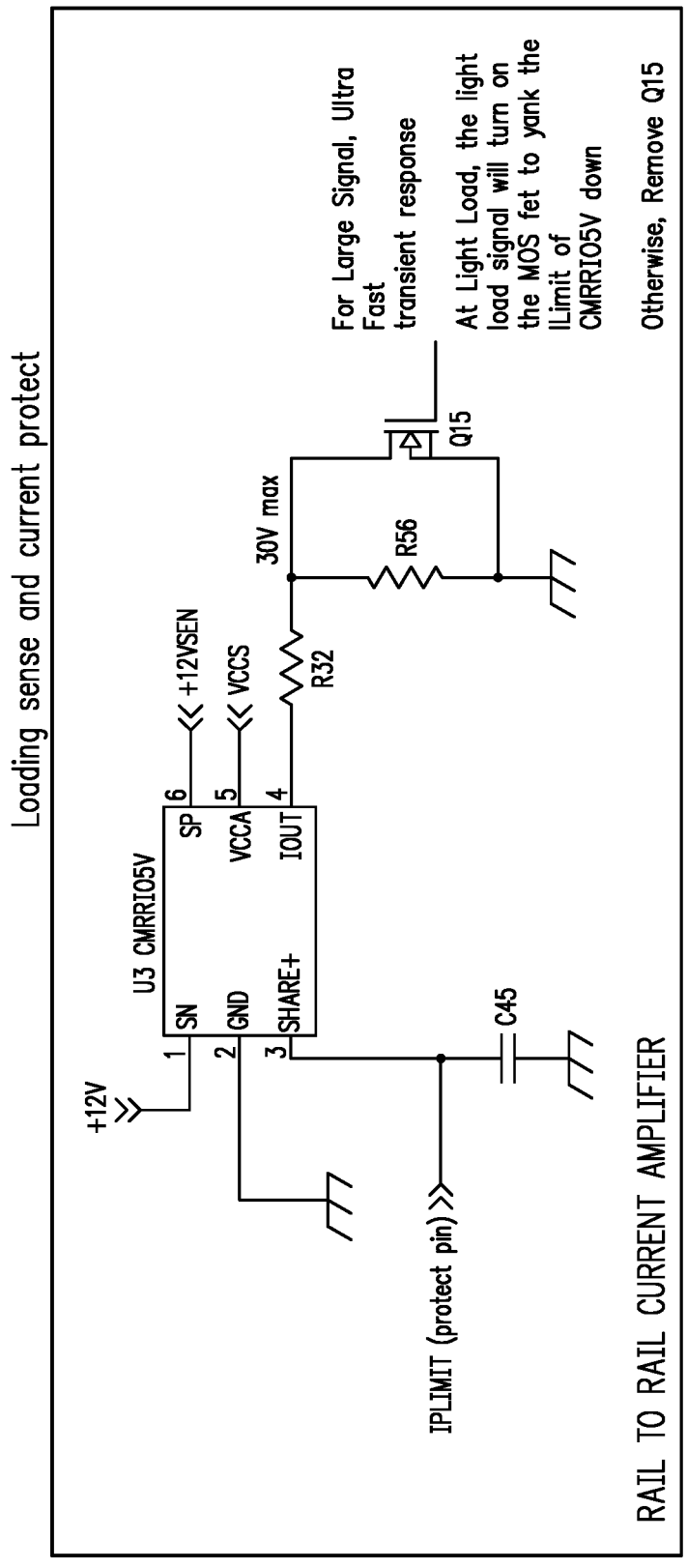

FIG. 6 illustrates a voltage regulator for a power supply controller in accordance with an embodiment of the present invention. As shown in FIG. 6, the DC-to-DC converter controller 108 can include a voltage regulator 128, such as a low dropout regulator (LDO). The auxiliary voltage Vaux1 (FIG. 2) can be coupled to an input of the regulator 128. The regulator 128 generates at its output 130 a voltage-regulated output signal VCCS. VCCS can be regulated at of level of 11.0 volts, for example. This voltage regulated output VCCS can be used to supply power to circuitry of the controller 108 and possibly other circuitry of the power supply. An output 131 (also referred to as "$V_O$") can be generated as an auxiliary output of the DC-to-DC converter stage 104 of the power supply. The level of the output 131 can be regulated to 12.0 volts, for example. The regulated output 131 of the DC-to-DC converter stateg 104 can be coupled to the output 130 of the voltage regulator 128 through a Schottky diode $D_{20}$.

During start-up, power for control circuitry 108 can be provided by the regulator 128 (via its VCCS output). As shown in FIGS. 2 and 4, start-up power is derived from the main PFC inductor (via the signal Vaux1). However, once the power supply reaches steady-state, then the DC-to-DC converter stage 104 begins generating and regulating its output 131. In the example, the level of the regulator output 131 is 12.0 volts or higher whereas the level of VCCS is regulated at 11.0. Once the level of the output 131 exceeds the level of the regulator 128 output VCCS by a diode voltage drop (across the diode $D_{20}$), then the output 130 of the regulator 128 will be pulled higher than its regulated level. This condition automatically shuts off the regulator 128 such that it ceases drawing power from Vaux1.

In the example, the DC-to-DC converter 104 output 131 is regulated at 12.0 volts or higher, whereas, the regulator 128 provides a 11.0 volt output. Once the output 131 of the DC-to-DC converter 104 exceeds 11.5 volts, which is one diode voltage drop higher than 11.0 volts, this inhibits operation of the regulator 128.

FIG. 7A-D illustrates a detailed schematic diagram of a DC-to-DC converter and DC-to-DC converter controller in accordance with an embodiment of the present invention. FIG. 8A-D illustrates DC-to-DC converter transformer circuitry in accordance with an embodiment of the present invention. FIGS. 7 and 8 show additional details regarding the arrangement of the voltage converter 128 and the diode $D_{20}$ which are described in connection with FIG. 6.

Referring to FIG. 8A-D, energy from the PFC output $V_{DC}$ is converted to a regulated output $V_O$ by the DC-to-DC converter stage 104 by activation of switches Q1 and Q2 of the DC-to-DC converter stage 104. Resulting current in the transformer T1 generates an auxiliary voltage Vaux2. Referring to FIG. 4A-D, this auxiliary voltage Vaux2 can be provided as an input to a voltage regulator 132 for the PFC stage controller 112 (FIGS. 2, 3 and 4A-D). The voltage regulator 132 generates a voltage VCC at its output. The level of VCC can be, for example, 15.3 to 15.5 volts DC.

The power supply is activated by applying an AC source to the AC inputs of the power supply. Power is then drawn from the bridge rectifier 110 (FIGS. 2 and 4A-D) of the PFC stage 102 which charges VCC towards 15.5 volts. More particularly, current from the bridge rectifier 110 charges capacitors $C_{14}$ and $C_{60}$ via a depletion-mode MOSFET $M_{UVLO}$ and via a node R+ and resistors 140 shown in FIG. 4A-D. The MOSFET MUVLO preferably has a high breakdown voltage (e.g. 800 volts) Charging the capacitors to 15.5 volts can take, for example, 100 ms. Once VCC reaches 15.5 volts, an under voltage lockout (ULVO) signal disables the current path through $M_{UVLO}$ and enables the PFC controller 112 to begin switching. The PFC controller 112 then commences switching its transistor switches QA and QB (FIG. 2; FIG. 4A-D shows a diode $D_3$ in place of QA). This switching action begins increasing $V_{DC}$ towards its initial target level (e.g., 440 volts). The switching will continue as $V_{DC}$ reaches its target level, unless the level of VCC falls below 10.0 volts. If VCC falls below 10.0 volts, then the UVLO signal will disable switching in the PFC stage. As shown in FIG. 4A-D, a comparator 134 compares VCC to 15.5 volts and 10.0 volts. When VCC falls below 10.0 volts, switching is disabled. This could result in a failure of the power supply to commence operation because the level of VCC must then rise to 15.5 volts before switching will commence again. In accordance with an embodiment of the present invention, when VCC falls below a predetermined threshold, e.g., 11.0 volts, the UVLO switch ($M_{UVLO}$ in FIG. 4A-D) is activated which draws power from the bridge rectifier 110 (via node R+ and resistors 140 shown in FIG. 4A-D). Activation of $M_{UVLO}$ tends to increase VCC, preventing it from falling to a level that would cause the UVLO signal to inhibit switching.

Figure 9:
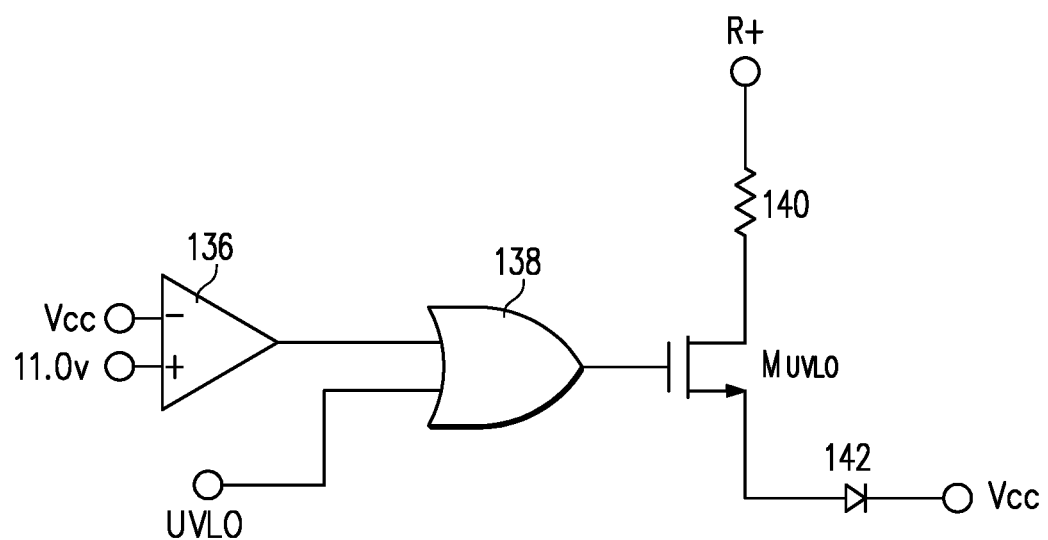
FIG. 9 illustrates a schematic diagram of circuitry for activing an under voltage lockout switch in accordance with an embodiment of the present invention.

FIG. 9 illustrates a schematic diagram of circuitry for activating $M_{UVLO}$ in accordance with an embodiment of the present invention. This circuitry can be included in the PFC controller 112 (FIG. 4A-D). As shown in FIG. 9, a comparator 136 compares VCC to a threshold (e.g. 11.0 volts). An output of the comparator 136 is applied to a first input of a logic OR gate 138. The signal UVLO is applied to a second input of the logic OR gate 138. The output of the logic OR gate is applied to the transistor switch $M_{UVLO}$.

When VCC is below 10.0 volts, the UVLO signal prevents switching in the PFC stage until VCC rises to 15.5 volts. Thereafter, if VCC falls to 11.0 volts, $M_{ULVO}$ is activated, which tends to increase VCC and thereby assists in preventing VCC from falling below 10.0 volts.

As described herein, switching in the PFC stage produces the DC auxiliary power supply voltage Vaux1, which can be used by the regulator 128 of the controller 108 for the DC-to-DC converter stage 104 to generate VCCS. The DC-to-DC controller 108 commences operation once VCCS rises to a threshold, e.g. 11.0 volts, and the level of PGB to changes to a logic low voltage. Once the DC-to-DC converter commences operation, current in the transformer T1 generates the auxiliary voltage Vaux2. Referring to FIG. 4A-D, this auxiliary voltage Vaux2 can be provided as an input to the voltage regulator 132 for the PFC stage controller 112. Once VCCS rises above 11.5 volts, the regulator 128 is disabled.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A switching power supply comprising:
   a first power supply stage configured to form an intermediate regulated voltage at an output node of the first power supply stage, wherein a switched current through an inductor of the first power supply stage induces a current through a coupled inductor for generating auxiliary power, the auxiliary power being configured to power circuitry of the power supply, wherein the intermediate regulated voltage is set to an initial target level upon start-up of the power supply whereby switching in the first power supply stage is inhibited from ceasing before the auxiliary power generated by the coupled inductor is sufficient to power the circuitry of the power supply, and wherein the intermediate regulated voltage is set to a second target level during steady-state operation of the power supply; and
   a second power supply stage configured to convert the intermediate regulated voltage into a regulated output voltage.

2. The switching power supply according to claim 1, wherein the initial target level is higher than the second target level.

3. The switching power supply according to claim 2, wherein the intermediate regulated voltage is regulated to a third target level under certain loading conditions.

4. The switching power supply according to claim 3, wherein the third target level is lower than the second target level.

5. The switching power supply according to claim 4, wherein the second target level is approximately 380 volts DC.

6. The switching power supply according to claim 1, wherein the first power supply stage is a power factor correction stage and the second power supply stage is a DC-to-DC converter stage.

7. The switching power supply according to claim 1, wherein the initial target level is achieved by lowering a voltage level at a feedback voltage node.

8. The switching power supply according to claim 7, further comprising a switched current source coupled to the feedback voltage node.

9. The switching power supply according to claim 8, wherein the switched current source is controlled by comparing a soft start voltage ramp to a reference voltage and when the soft start voltage ramp reaches the reference level the switched current source is disabled.

10. The switching power supply according to claim 1, wherein the initial target level is higher than a range of expected AC input voltages.

11. The switching power supply according to claim 1, wherein the auxiliary power being configured to power control circuitry for the second power supply stage.

12. A switching power supply comprising controller circuitry, the controller circuitry being configured to control switching in the switching power supply and the controller circuitry configured to receive power from a first voltage source comprising a voltage regulator, wherein during a start-up phase of the switching power supply, the voltage regulator forms a first regulated output for powering the controller circuitry and wherein after the start-up phase, the first regulated output is coupled to a second voltage source for powering the controller circuitry, wherein the second voltage source forms a second regulated output that is regulated at a higher level than the first regulated output, thereby disabling the voltage regulator.

13. The switching power supply according to claim 12, wherein the first regulated output is coupled to the second regulated output via a diode.

14. The switching power supply according to claim 12, wherein the controller circuitry controls switching in the power supply for generating the second regulated output.

15. The switching power supply according to claim 12, wherein the second voltage source provides power for the controller circuitry after the start-up phase.

16. The switching power supply according to claim 15 comprising a first power supply stage that forms an intermediate regulated voltage and a second power supply stage configured to accept the intermediate regulated voltage and wherein the second power supply stage is configured to generate the second regulated output.

17. The switching power supply according to claim 16, wherein the voltage regulator receives power from the first power supply stage.

18. The switching power supply according to claim 17, wherein the first power supply stage comprises a main inductor and wherein power is provided to the voltage regulator by a current induced in a second inductor that is inductively coupled to the main inductor.

19. A switching power supply comprising a power supply stage having controller circuitry, the controller circuitry being configured to control switching in the power supply stage and the controller circuitry receiving its operating power from a capacitor during a start-up phase, wherein the capacitor is charged by a rectified alternating-current (AC) signal and the controller circuitry comprising a voltage regulator, wherein the controller circuitry receives its operating power from the voltage regulator after the start-up phase, wherein upon commencement of the start-up phase, the capacitor is charged to an initial voltage level and, when the initial voltage level is reached, charging of the capacitor is halted and wherein charging of the capacitor is recommenced when a monitored voltage on the capacitor approaches a threshold to inhibit the voltage on the capacitor from reaching the threshold.

20. The switching power supply according to claim 19, wherein during the start-up phase, controller circuitry controls switching in the power supply stage to form a regulated voltage and, if the voltage level on the capacitor falls below the threshold, the switching is halted.

21. The switching power supply according to claim 20, wherein said charging of the capacitor prevents the switching from being halted by inhibiting the voltage on the capacitor from reaching the threshold.

22. The switching power supply according to claim 21, wherein the power supply stage comprises a power factor correction (PFC) stage configured to form an intermediate regulated voltage and wherein the switching power supply further comprises a DC-to-DC converter and wherein the DC-to-DC converter is configured to accept the intermediate regulated voltage and wherein an output of the DC-to-DC converter provides power to the voltage regulator.

23. The switching power supply according to claim 22, wherein the initial voltage level is approximately 15.3 to 15.5 volts and wherein the threshold is approximately 10.0 volts.

24. The switching power supply according to claim 23, wherein charging of the capacitor is commenced when the voltage on the capacitor reaches 11.0 volts.

25. The switching power supply according to claim 19, wherein a current for charging the capacitor is controlled by a depletion-mode MOSFET.

26. A switching power supply comprising:
a first power supply stage configured to form an intermediate regulated voltage, the first power supply stage comprising first controller circuitry configured to control switching in the first power supply stage for forming the intermediate regulated voltage, wherein the intermediate voltage is regulated to an initial target level upon start-up of the power supply and wherein the intermediate regulated voltage is regulated to a second target level during steady-state operation of the power supply; and
a second power supply stage configured to convert the intermediate regulated voltage into a power supply output voltage, the second power supply stage comprising a controller circuitry configured to control switching in the second power supply stage and the second power supply stage comprising a voltage regulator, wherein during a start-up phase of the switching power supply, the voltage regulator forms a first regulated output for powering the controller circuitry of the second power supply stage and wherein after the start-up phase, the first regulated output is coupled to the power supply output voltage, the power supply output voltage being regulated at a higher level than the first regulated output, thereby disabling the voltage regulator.

27. The switching power supply according to claim 26, wherein the controller circuitry receives power from a capacitor during a start-up phase, and wherein the capacitor is charged by a rectified alternating-current (AC) signal.

28. The switching power supply according to claim 27, wherein upon commencement of the start-up phase, the capacitor is charged to an initial voltage level and, when the initial voltage level is reached, charging of the capacitor is halted.

29. The switching power supply according to claim 26, wherein the initial target level is higher than the second target level.

30. The switching power supply according to claim 29, wherein the intermediate regulated voltage is regulated to a third target level under light loading conditions.

31. The switching power supply according to claim 30, wherein the third target level is lower than the second target level.

32. The switching power supply according to claim 31, wherein the second target level is approximately 380 volts DC.

\* \* \* \* \*